United States Patent
Kaminski

(10) Patent No.: US 7,681,311 B2
(45) Date of Patent: Mar. 23, 2010

(54) ROUTING OF POWER AND DATA FROM A VOLTAGE SOURCE TO MULTIPLE ELECTRICALLY POWERED TOOLS IN A MULTI-TOOL PROCESSING STATION

(75) Inventor: Ulrich Kaminski, Barthloma (DE)

(73) Assignee: Cooper Power Tools GmbH & Co., Westhausen (DE)

( * ) Notice: Subject to any disclaimer, the term of this patent is extended or adjusted under 35 U.S.C. 154(b) by 1204 days.

(21) Appl. No.: 10/899,963

(22) Filed: Jul. 27, 2004

(65) Prior Publication Data

US 2005/0207191 A1     Sep. 22, 2005

(30) Foreign Application Priority Data

Mar. 22, 2004    (EP)    ................... 04006868

(51) Int. Cl.
*H01R 43/00*    (2006.01)
(52) U.S. Cl. ............... 29/857; 29/33 M; 81/57.22; 174/28; 340/310.11; 700/83
(58) Field of Classification Search ............. 29/842, 29/857, 33 M; 340/310.11, 870.06; 81/57.22; 82/71; 710/68; 174/28; 307/40; 700/83, 700/168, 225
See application file for complete search history.

(56) References Cited

U.S. PATENT DOCUMENTS

| | | | |
|---|---|---|---|
| 2,997,519 A * | 8/1961 | Hines et. al. ................... 174/28 |
| 3,757,613 A * | 9/1973 | Arndt et al. ................. 81/57.22 |
| 3,786,700 A * | 1/1974 | King ........................... 82/171 |
| 3,926,264 A | 12/1975 | Bardwell et al. |
| 4,081,037 A | 3/1978 | Jonsson |
| 4,104,779 A | 8/1978 | Sigmund |
| 4,354,233 A | 10/1982 | Zhukovsky et al. |
| 4,427,077 A | 1/1984 | Hall |
| 4,470,181 A * | 9/1984 | Sergeant ..................... 29/33 M |
| 4,502,549 A | 3/1985 | Hornung et al. |
| 4,544,039 A | 10/1985 | Crane |

(Continued)

FOREIGN PATENT DOCUMENTS

EP     0879670     11/1998

(Continued)

OTHER PUBLICATIONS

Marked-up copy of 7,088,232.*

*Primary Examiner*—Rick K Chang
(74) *Attorney, Agent, or Firm*—King & Spalding LLP

(57) ABSTRACT

A multi-tool process station includes a tool sub-station having a plurality of electrically powered tools moveable between an operating position and a ready position; a voltage source spaced therefrom by a distance; at least one controller spaced from the tool sub-station and in communication with the tools; a cable structure extending across the distance and having not more than one outer cable sheath at any point along the distance, the cable structure supplying power from the voltage source to a plurality of the tools and further carrying control signals to the plurality of tools. The cable structure may consist of a single continuous cable, or may comprise multiple cable segments, such as first and second cables connected in series. The tool sub-station may be disposed proximate a vehicle manufacturing line and the plurality of tools comprise at least a plurality of screw spindles.

19 Claims, 3 Drawing Sheets

U.S. PATENT DOCUMENTS

| | | | |
|---|---|---|---|
| 5,094,301 A | | 3/1992 | Wipperman et al. |
| 5,105,519 A | | 4/1992 | Doniwa |
| 5,149,277 A | * | 9/1992 | LeMaster .................. 439/207 |
| 5,439,063 A | | 8/1995 | Anders et al. |
| 5,819,115 A | * | 10/1998 | Hoese et al. .................. 710/68 |
| 5,834,698 A | | 11/1998 | Izui et al. |
| 5,898,598 A | | 4/1999 | Szwast et al. |
| 6,445,087 B1 | * | 9/2002 | Wang et al. ................... 307/40 |
| 6,848,516 B2 | | 2/2005 | Giardino |
| 7,061,399 B2 | * | 6/2006 | Leck ..................... 340/870.06 |
| 7,088,232 B2 | * | 8/2006 | Wetmore ................... 340/538 |
| 7,090,031 B2 | | 8/2006 | Kaminski |
| 7,346,406 B2 | * | 3/2008 | Brotto et al. .................. 700/83 |
| 2004/0040727 A1 | | 3/2004 | Miller |

FOREIGN PATENT DOCUMENTS

| | | |
|---|---|---|
| EP | 1151821 | 11/2001 |
| WO | WO 0203062 | 4/2002 |

* cited by examiner

ROUTING OF POWER AND DATA FROM A VOLTAGE SOURCE TO MULTIPLE ELECTRICALLY POWERED TOOLS IN A MULTI-TOOL PROCESSING STATION

This application claims priority from European Patent Application No. 04006868.6, filed on 22 Mar. 2004, which is incorporated herein by reference.

BACKGROUND OF THE INVENTION

The present invention generally relates to the control of electrically powered manufacturing tools, and particularly relates to the routing of power and data from a voltage source to the plurality of electrically powered manufacturing tools of a tool sub-station that is located a distance from the voltage supply in a multi-tool process machine.

The use of various electrically powered machines to help automate production processes such as welding, screwing, or similar processes is well known in the art. Indeed, it is not uncommon for such machines to employ multiple tools of this type. Such multiple tool machines typically include a plurality electrically powered tools which are supported at a so-called tool sub-station for movement between an operation position and a storage or ready position; a voltage source distinct from the tool sub-station and spaced therefrom by a distance; and at least one controller. The controller typically electrically connects with the voltage source via one or more cables, and the voltage source typically electrically connects to each of the numerous individual tools over corresponding plurality of individual cables running therebetween. Indeed, it is common for the voltage source to use at least two different and individual cables to connect with each individual tool, meaning, for example, at least sixteen cables are required for eight tools. Thus, there are a large number of cables running from the voltage source to the tool sub-station for the supply of power.

The wiring complexity associated with the prior art machines described above adds cost to the machine, as each cable is typically expensive, and also add significant complexity to the overall mechanical structure to support the numerous cables. Further, the large number of cables complicates installation and maintenance of the machines.

Thus, there remains a need for alternative approaches to supplying power and data to electrically powered manufacturing tools of a multi-tool process station.

SUMMARY OF THE INVENTION

The present invention provides a method of supplying power and data to electrically powered manufacturing tools of a multi-tool process station. The multi-tool process station of the present invention includes a tool sub-station having a plurality of electrically powered tools disposed thereat, the tools moveable between an operating position and a ready position; a voltage source distinct from the sub-station and spaced therefrom by a distance; at least one controller spaced from the tool sub-station and in communication with the tools; a cable structure extending across the distance and having not more than one outer cable sheath at any point along the distance, the cable structure supplying power from the voltage source to more than one of said plurality of tools and further carrying control signals from the controller to said more than one of said plurality of tools. The cable structure may consist of a single continuous cable, or may comprise multiple cable segments connected in series. If there is more than one cable portion, the cable portion closest to the tools is advantageously more flexible than the other portion(s) of the cable structure, and is advantageously detachable. The cable structure may terminate directly at a first one of the plurality of tools, and the plurality of tools may be connected in electrical series to the cable structure, advantageously with a termination plug connected thereto with the plurality of tools electrically between the cable structure and the termination plug. Alternatively, the tool sub-station may comprise a distribution block, with the distribution block electrically disposed between the cable structure and the plurality of tools. The cable structure may comprise multiple conductors in a common sheath, and the conductors may be selected from the group consisting of electrical conductors and optical conductors. For example, the cable may comprise at least one conductor shielded from other conductors in the cable and suitable for use in an ARCnet. The tool sub-station may be disposed proximate a vehicle manufacturing line and the plurality of tools may comprise at least a plurality of screw spindles. The spindles may each comprise at least one measurement transducer and an address device.

DETAILED DESCRIPTION OF THE INVENTION

Figure 1:
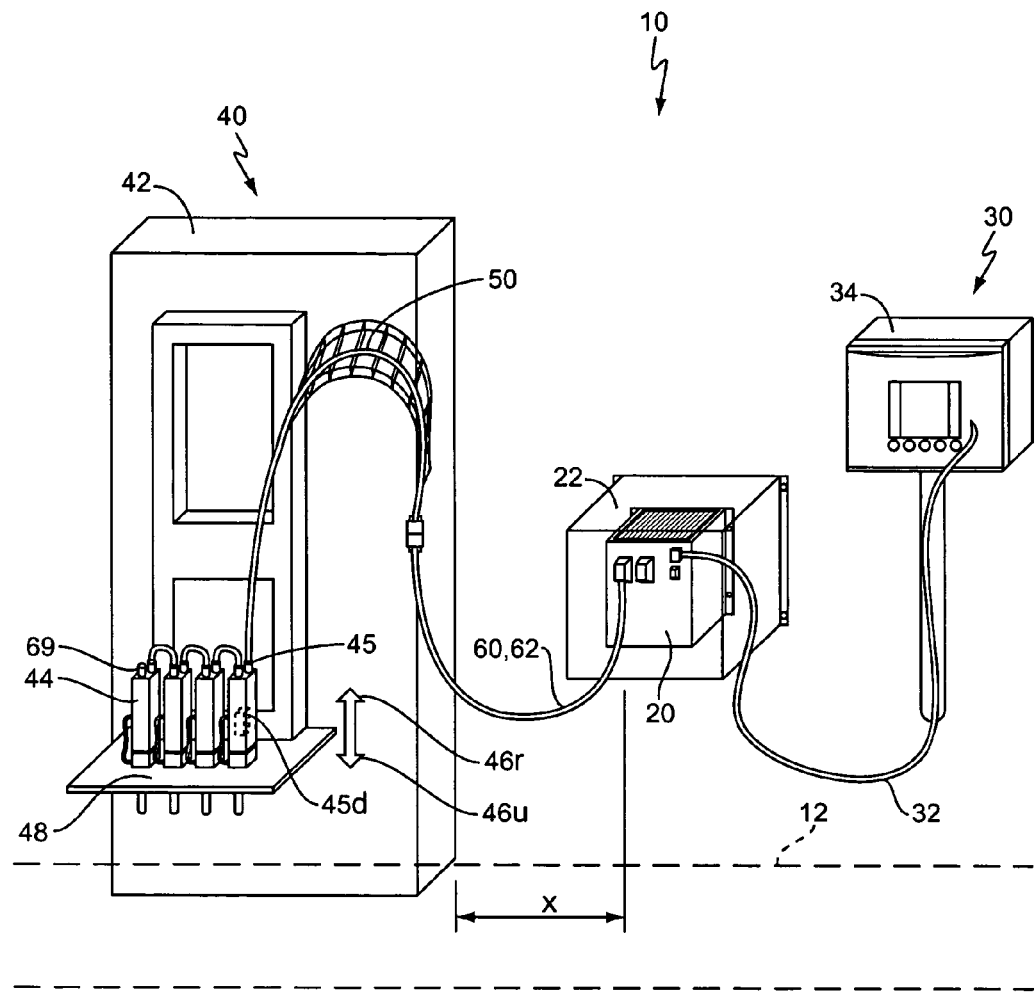
FIG. 1 shows a multi-tool process station according to one embodiment of the present invention.

FIG. 1 shows an exemplary multi-tool machine, sometimes referred to herein as a multiple tool processing assembly or multi-tool process station, generally referred to at 10. The multi-tool machine 10 of FIG. 1 includes a tool sub-station 40, a voltage source 20, a controller 30, and one or more cables 32, 62. For the sake of clarity, the tool sub-station 40, voltage source 20, and controller 30 are merely generally described below, with details thereof only added where necessary to aid in understanding the present invention; such devices are generally known and understood in the art. The tool sub-station 40 typically includes a cabinet 42 or other frame that supports a plurality of tools 44 for movement between an operating position 46$u$ (e.g., down) and a storage or ready position 46$r$ (e.g., up). Typically, the tools 44 are detachably mounted to a so-called screw plate 48, with the screw plate 48 moving vertically up and down to move the various tools 44 up and down in unison. The tools 44 are electrically powered and may take any form known in the art such as screw spindles, welders, or the like. It should be noted that the tools 44 may advantageously include appropriate address means 45, such as rotary switches, for setting the address for each tool if the tools 44 are be controlled via addressed signals. The individual tools 44 may also include measurement transducers 45$d$, gear drives, measuring electronics, motors, and the like, as needed or desired. In addition, the individual tools 44 may have straight, offset, or angled drive outputs, as needed or desired. The tool sub-station 40 is typically located proximate an assembly line 12, such as a vehicle assembly line.

The voltage source 20 supplies the necessary voltages to power the tools 44. The voltage source 20 may provide a single voltage, such as 24 VDC, or a plurality of voltages such as 380 VDC and 24 VDC depending on the type and number of tools 44. As is known in the art, the voltage source 20 may optionally include a braking chopper which is designed for a fixed or varying cycle time, a turn-on current limiting device, a voltage monitoring device with switch-off at prescribed minimum and/or maximum voltage values, a temperature monitoring device, heat sinks, a mains filter, a mains connection, a main switch, a main contactor, operating signal lamps, an emergency-stop device, and similar devices. The voltage source 20 may further be advantageously housed in a suitable module housing 22, and be mountable in a variety of ways, including via mounts that also function as heat sinks. As shown in FIG. 1, the voltage source 20 is spaced from the tool sub-station 40 by distance X, with this distance spanned by a cable structure 60, discussed further below.

Controller 30 controls the overall operation of the machine 10. The controller 30 is typically housed in a cabinet 34 or the like at some distance from the tool sub-station 40. The controller 30 may be located away from the voltage source 20, or co-housed therewith (see FIG. 2), as is desired. The controller 30 may connect to the voltage source 20 via a cable 32 or other means for carrying power and/or data therebetween. Further, the connection between the controller 30 and the voltage source 20 for the flow of data one or both ways may be via a wireless connection, such as an RF link, if desired.

The voltage source 20 supplies power to the tool sub-station 40 so as to enable the tools 44 to function. In the present invention, the power for a plurality of the tools 44, and optionally all the tools 44, is routed through the cable structure 60 that extends across the distance X separating the voltage source 20 and the tool sub-station 40. Typically, this cable path 60 takes the form of a single continuous cable 62, but the cable structure 60 may alternatively take the form of a plurality of cable sections connected in series. For example, the cable structure 60 may have a first portion 62 that spans the majority or totality of distance X, and a second flexible cable portion 50 detachably connected to the first portion 62 so as to be more proximate to the tools 44. It should be understood that the term "cable," as used herein, refers to a collection of one or more conductors 64 that share a common cable sheath 68 along substantially all of the relevant portions of their length, regardless of their configuration (e.g., layered, twisted, side-by-side duplex, etc.) within the common cable sheath 68. It should be noted that the conductors 64 may be of any type known in the art, such as common copper wires or optical fibers.

The cable structure 60 may advantageously extend beyond its first mechanical connection to the tool sub-station 40 so that the cable structure 60 terminates at one of the tools 44. Alternatively, the cable structure 60 may terminate at a distribution box 52 that forms part of the tool sub-station 40. In any case, the connection to the cable structure 60 may be relatively permanent, or may advantageously be made using suitable connectors that allow the cable structure 60 to be disconnected when desired, such as for purposes of repair or replacement. Indeed, all the data and power connections in the machine 10 may be made in a permanent fashion, or advantageously through appropriate detachable connections (e.g., plug connectors, etc.).

Data, such as commands and other instructions from the controller 30 are also routed through the cable structure 60. As such, the cable structure 60 may include suitably shielded conductors 66 for carrying data signals network communications, especially LAN communications, such as an ARCnet LAN. The tools 44 should include appropriate electronics to separate data from power.

As pointed out above, the cable structure 60 from the voltage source 20 may terminate at a distribution box 52 in the tool sub-station 40. With such an arrangement, the individual tools 44 may then be connected to the distribution box 52 by respective flexible cables 50t. Alternatively, the cable structure 60 may terminate at a first tool 44 in the tool sub-station 40, with one or more other tools 44 connecting thereto in a daisy-chain fashion. Such a daisy-chain may be open ended or close ended (e.g., a ring). It should be note that the chain may advantageously terminate in a simple termination plug 69, or in an over-voltage protection device if desired. The termination plug may be removed from one tool and added to another when adding or deleting tools 44 to the daisy-chain.

Figure 2:
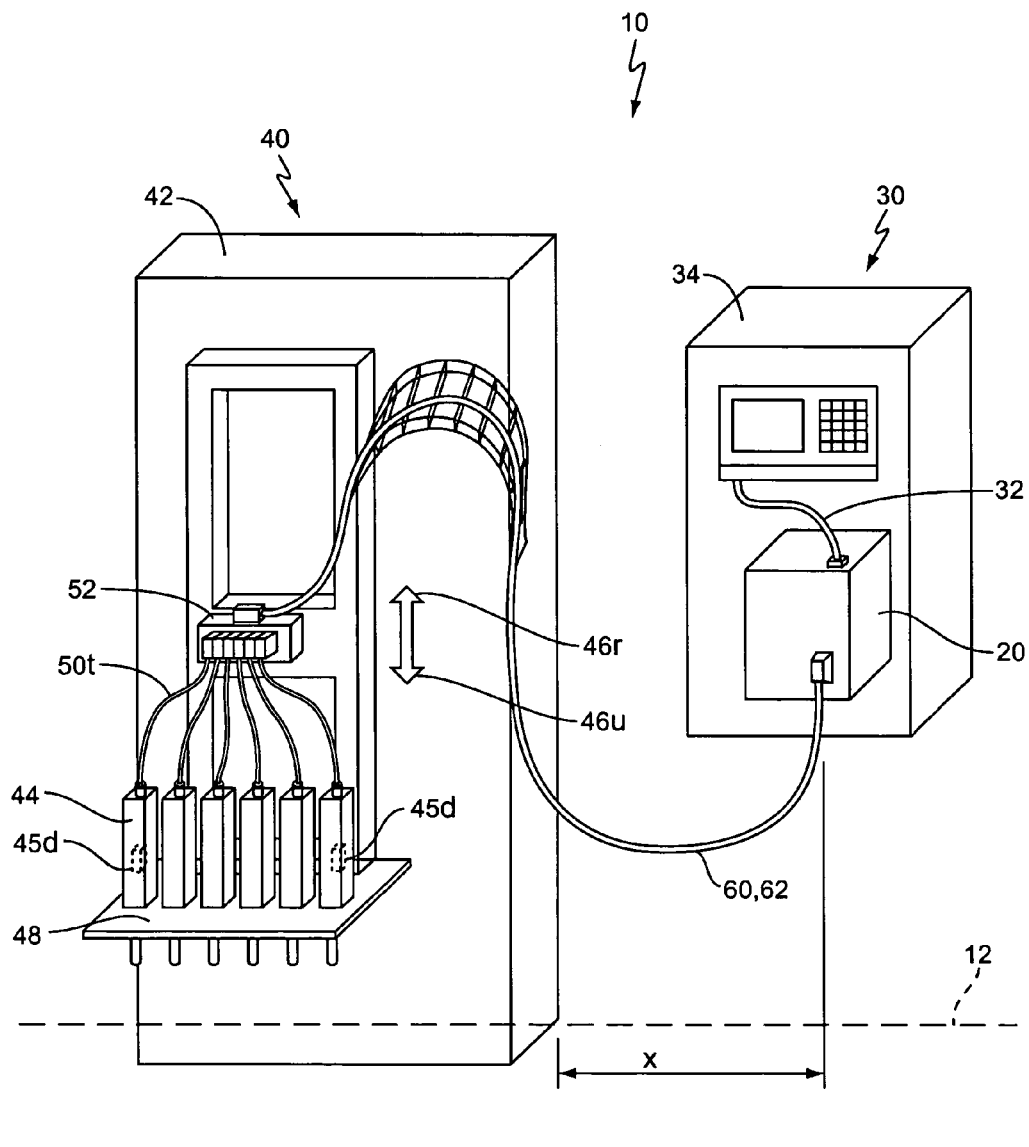
FIG. 2 shows a multi-tool process station according to another embodiment of the present invention.
Figure 3:
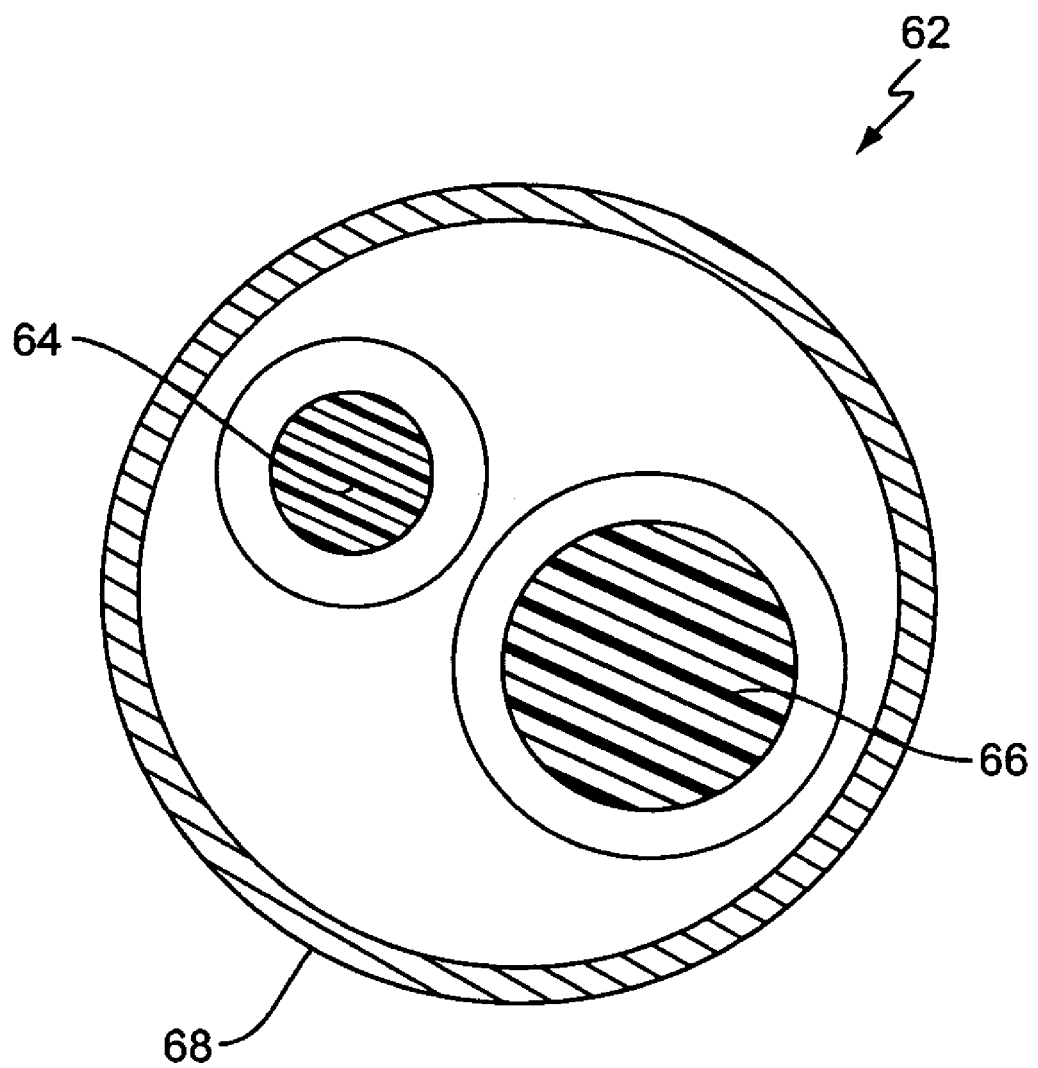
FIG. 3 shows a cross-section of a cable suitable as the cable structure in the embodiment of FIG. 1.

By way of example, FIG. 1 shows a multi-tool machine 10 according to one embodiment of the present invention with the voltage source 20 separate from the controller 30, the cable structure 60 including a flexible cable 50, and the flexible cable 50 terminating at a tool 44, with the tools 44 connected in a daisy-chain. In the embodiment of FIG. 1, the first cable portion 62 forming the distal portion of cable structure 60 is typically installed relatively permanently, and sometimes referred to as a field cable. Such a field cable 62 will generally be less expensive than the corresponding flexible cable 50, which will generally be more expensive due to the additional flexibility and environmental requirements placed thereon. FIG. 2 shows another multi-tool machine 10 according to another embodiment of the present invention with the voltage source 20 and the controller 30 in a common cabinet, the cable structure 60 terminating at distribution box 52, and the individual tools 44 connecting to the distribution box 52 by respective flexible cables 50t in a fan-out arrangement. Once again, the field cable 62 forming a portion of the cable structure 60 will typically be less expensive than the multiple flexible cables 50t connecting the distribution box 52 to the tools 44 due to the flexibility and environmental requirements on the flexible cables 50t.

By supplying power and data signals to more than one tool 44 through a common cable structure 60, the costs of installing and maintaining the multi-tool machine 10 are greatly reduced. For instance, the control electronics for multiple tools 44 may be combined into a common controller 30, rather than having to have a separate controller 30 for each tool 44. Further, as the number of cables is reduced, the amount of cable breakage electronics and associated maintenance can be reduced.

In preferred embodiments, the multi-tool machine 10 will have only a single cable structure 60 extending from the voltage source 20 to the tool sub-station 40 that supplies all the power and data for all the various tools 44. As used herein, the terms "single cable structure" or "not more than one cable structure" exclude the use of multiple cables in parallel, but allow any number of cables to be used in series. In other embodiments, such as where the number of tools 44 is quite high or the power consumption of the tools 44 is high, the multi-tool machine 10 may have more than one cable structure 60 extending between the voltage source 20 and the tool sub-station 40, with at least one cable structure 60 supplying power and data to more than one tool 44.

While the discussion above has been in terms of a dedicated controller 30 and voltage source 20 for a given tool sub-station 40, the approach of the present invention may also be used where more than one tool sub-station 40 is connected to a given voltage source 20 (via separate cable structures 60), and/or where a given controller 30 controls more than one tool sub-station 40, or a combination thereof.

Additionally, those skilled in the art should recognize that, in general, the foregoing description and the accompanying illustrations represent exemplary embodiments of the present invention and should not be construed as limiting it. Indeed, the present invention is limited only by the following claims and the reasonable equivalents thereof.

What is claimed is:

1. A multiple tool processing assembly, comprising:
   a tool sub-station having a plurality of electrically powered tools disposed thereat, said tools moveable between an operating position and a ready position;
   a voltage source distinct from said sub-station and spaced therefrom by a distance;
   at least one controller spaced from said tool sub-station and in communication with said tools;
   a cable structure extending across said distance and having one, and not more than one, outer cable sheath at any point along said distance, said cable structure comprising a plurality of conductors disposed within the outer cable sheath, said conductors supplying power from said voltage source to said plurality of said tools and further carrying control signals, from said controller, to said plurality of tools, wherein said plurality of tools are connected in electrical series to said cable structure.

2. The assembly of claim 1 wherein said cable structure consists of a single continuous cable.

3. The assembly of claim 1 wherein said cable structure comprises first and second cables connected in series.

4. The assembly of claim 3 wherein said second cable is more flexible than said first cable.

5. The assembly of claim 3 wherein said second cable is detachably connected to said first cable.

6. The assembly of claim 1 wherein said cable structure terminates directly at a first one of said plurality of tools.

7. The assembly of claim 1 further comprising a termination plug connected to said cable structure with said plurality of tools electrically therebetween.

8. The assembly of claim 1 wherein said tool sub-station comprises a distribution block, and wherein said distribution block is electrically disposed between said cable structure and said plurality of tools.

9. The assembly of claim 1 wherein said cable structure comprises multiple conductors in a common sheath.

10. The assembly of claim 9 wherein said multiple conductors are selected from the group consisting of electrical conductors and optical conductors.

11. The assembly of claim 9 wherein said cable comprises at least one conductor shielded from other conductors in said cable.

12. The assembly of claim 1 wherein said tool sub-station is disposed proximate a vehicle manufacturing line and wherein said plurality of tools comprise at least a plurality of screw spindles.

13. The assembly of claim 12 wherein said spindles each comprise at least one measurement transducer and an address device.

14. The assembly of claim 1:
   wherein said cable structure terminates directly at a first one of said plurality of tools and wherein said plurality of tools are connected in electrical series to said cable structure;
   wherein said tool sub-station is disposed proximate a vehicle manufacturing line; and
   wherein said plurality of tools comprise at least a plurality of screw spindles.

15. The assembly of claim 14 wherein said cable structure comprises a flexible cable portion disposed proximate said plurality of tools.

16. The assembly of claim 1:
   wherein said tool sub-station comprises a distribution block, and wherein said distribution block is electrically disposed between said cable structure and said plurality of tools; and wherein said cable structure terminates directly at said distribution block
   wherein said tool sub-station is disposed proximate a vehicle manufacturing line; and
   wherein said plurality of tools comprise at least a plurality of screw spindles.

17. The assembly of claim 16 wherein said cable structure comprises a flexible cable portion disposed proximate said plurality of tools.

18. The assembly of claim 1 wherein said plurality of tools comprise at least a plurality of screw spindles and wherein said spindles each comprise at least one measurement transducer and an address device.

19. The assembly of claim 1 wherein said cable structure supplies all the power to all of said plurality of tools.

* * * * *